United States Patent Office 3,404,159
Patented Oct. 1, 1968

3,404,159
BIS HETERO METHYLENE MALONONITRILES
Albert F. Strobel, Delmar, and Sigmund C. Catino, Castleton, N.Y., assignors to GAF Corporation, a corporation of Delaware
No Drawing. Continuation-in-part of application Ser. No. 242,353, Dec. 5, 1962. This application Dec. 19, 1966, Ser. No. 602,573
11 Claims. (Cl. 260—329)

ABSTRACT OF THE DISCLOSURE

Substantially colorless compounds which exhibit a prominent absorption peak between 250 m$\mu$ and 400 m$\mu$ and which are outstanding absorbents for ultra-violet radiation and excellent stabilizers for organic materials against the degradative effect of such radiation are characterized as bis monocyclic heterocyclic methylene malononitriles, said heterocyclics being of the group containing 5 and 6 members in the ring and wherein the hetero atom is at least one of the group of oxygen, nitrogen and sulfur.

---

This application is a continuation-in-part of application Ser. No. 242,353, filed Dec. 5, 1962, and now abandoned.

This invention relates to new and useful compounds which impart to organic materials superior resistance to degradation and deterioration when they are exposed to actinic radiation, and in particular to ultra-violet radiation. This invention further relates to processes for the preparation of new and useful compounds of the type hereinbefore described. The compounds with which this invention is concerned are characterized as bis hetero methylene malononitriles.

Various organic compounds exhibit the power to absorb electromagnetic radiations within the band of 2900 to 3700 A. and when incorporated in various plastic materials such as transparent sheets, the resultant sheet acts as a filter for all of the radiation passing through and will transmit only such radiations as are not absorbed by the sheet and/or the absorbing agent. It is thus possible to screen out undesirable radiations and utilize the resulting transparent sheet as a filter in many technical and commercial applications such as wrappings for food products and the like.

Numerous organic compounds have been suggested as absorbents for the range of radiations described above, which range is designated as the ultra-violet range. Such uses include incorporation in plastic sheet materials and the stabilization in general of transparent plastic bodies. By far, the greatest concern with respect to ultra-violet radiations is with those radiations which come from the sun. Most of these radiations have wave lengths between 250 and 400 millimicrons. The effects of such radiation on the human skin, producing sunburn and suntan are of course well known. Other effects, however, of great commercial importance relate to the photochemical degradation caused by ultra-violet radiation. Many commercial products are either unstable when subjected to such radiations, or are affected to the extent that they become undesirable or unsalable. Many plastic materials, when exposed to this radiation, undergo substantial degradation resulting in the development of undesirable color bodies and subsequent loss of transparency. Food products, in addition to becoming discolored often become unfit for human consumption. Thus, prolonged exposure of fruits, edible oils, butter and other prepared foods will spoil and turn rancid on exposure to ultra-violet light. It is well known that colored objects such as dyed textiles will fade on exposure to sunlight, and in particular to ultra-violet light. Many plastics, in addition to developing color formation and reduction in transparency, become brittle, lose their elasticity, crack and eventually completely deteriorate on exposure to sunlight. Paints, varnishes, lacquers and the like also are prone to these effects, even though here the transparency property may not be paramount.

We have discovered that by combining bis hetero methylene malononitriles with organic materials, there results compatible combinations with a vast number of film forming plastics, resins, gums, waxes and the like, which combinations further exhibit outstanding ultra-violet absorbing properties within the generally encountered ultra-violet region of 250 to 400 millimicrons. The compounds with which this invention is concerned, even though they exhibit outstanding absorbing properties close to the visible region of the electro magnetic field, nevertheless are essentially colorless compounds and can be employed with the assurance that they will not contribute to color in normally colorless formulations, nor will they affect the color of a colored formulation such as a paint film or a dyed textile. Many of the compounds of this invention also absorb some visible light on the violet end of the spectrum which renders them particularly useful in many formulations which are susceptible to visible light degradation. Thus polyesters and polyethylene are known to be so characterized, and the stabilization of these materials is extremely successful when using the compounds herein contemplated.

The compounds of this invention, additionally, are outstanding in that they do not require a phenolic hydroxyl group in order to achieve light stability. The heretofore used hydroxy-benzophenone absorbers must have such a grouping. The presence of an hydroxyl which is capable of salt formation renders these absorbers unsuitable for use in alkaline media and particularly in alkaline plastic materials such as epoxys, melamines and the like. While the compounds of the present invention do not require an hydroxyl group, the presence thereof is not disadvantageous, or a detriment where alkaline sensitivity is no problem.

It is therefore an object of the present invention to provide new and useful compounds characterized by outstanding ultra-violet absorbing properties.

It is still another object of this invention to provide new and useful bis hetero methylene malononitriles which are outstanding ultra-violet absorbing compounds.

It is still a further object of the present invention to provide processes for the preparation of new and useful ultraviolet absorbing compounds.

It is still a further object of the present invention to provide processes for the preparation of new and useful ultra-violet absorbing compounds which are characterized as bis hetero methylene malononitriles.

Other objects will appear hereinafter as the description proceeds.

The bis hetero methylene malononitriles which are contemplated in this invention exhibit a prominent peak, or peaks, between 250 A to 400 A and are devoid of nitro groups and nuclear bonded amino groups and have the following general formula

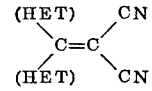

wherein each HET represents independently a 5- or 6-membered heterocyclic nucleus or a benzo (5- or 6-membered) heterocyclic nucleus containing at least one pair of conjugated double bonds, and wherein the hetero atoms are oxygen, nitrogen and/or sulfur.

Examples of suitable heterocycles are: thiophene, furane, pyrrole, $\alpha$-pyran, $\alpha$-pyrone, pyridine, 1,2-dihydropyridine, oxazole, thiazole, isoxazole, isothiazole, pyrazole, 3-isopyrazole, imidazole, 2-isoimidazole, 1,2,3-triazole, 1,2,4-triazole, tetrazole, 1,3,4-oxadiazole, 1,2,5-oxadiazole, 1,2,3-thiadiazole, 1,2,3-oxathiazole, pyridazine, pyrimidine, pyrazine, 1,3,5-triazine, and fused ring systems of benzene nuclei and naphthalene nuclei with the aforementioned heterocyclics, e.g., benzothiophene, benzofurane, cinnoline, phthalazine, benzimidazole, 1,2,3-benztriazole, benzoxazole.

The hetero nuclei may contain alkyl, substituted alkyl, halogen, acyl, sulfonyl, carboxamido, oxy and similar inert substituents which may vary the ultra-violet absorption spectrum but which do not affect the function and stability of the compounds. Such substituents include: alkyl, methyl, ethyl, n-propyl, iso-propyl, n-butyl, iso-butyl, tertiary-butyl, secondary-butyl, n-amyl, iso-amyl, tertiary-amyl and the other isomeric amyls, n-hexyl, iso-hexyl and the other isomeric hexyls, n-heptyl, iso-heptyl and the other isomeric heptyls, n-primary nonyl (nonyl-1), nonyl-(2), nonyl-(3), nonyl-(5), 2-methyl-octyl-2, 4-ethyl-heptyl-4, 2-methyl-4-ethyl-hexyl-4, n-primary octyl (capryl), octyl-(2), 2-methyl-3-ethyl-pentyl-3, 2,2,4-trimethyl-pentyl-4, 2-ethyl - hexyl - 1, 2-methyl-heptyl-2, 3-methyl-heptyl-3, 4-methyl-heptyl-4, n-primary decyl (decyl-1), decyl-4 (secondary decyl), 2-ethyl-octyl-3 (tertiary decyl), 4-propyl-heptyl-4 (tertiary decyl), undecyl-1 (n-primary decyl), dodecyl-1 (n-dodecyl), tridecyl-1 (n-tridecyl), tridecyl-7, 3-ethyl-undecyl, tetradecyl-1 (n-tetradecyl), pentadecyl-1 (n-pentadecyl), pentadecyl-8, hexadecyl (cotyl), heptadecyl-9, octadecyl-1, 2-methyl heptadecyl-2, eicosyl-1, docosyl-1, tricosyl-12, tetracosyl, tricapryl, pentacosyl, hexacosyl, heptacosyl, octacosyl, nonacosyl, myrisyl (30 carbons).

Alkenyl: allyl ($CH_2$=$CHCH_2$—), methallyl ($CH_2$=$C(CH_3)CH_2$—)

crotyl ($CH_3CH$=$CHCH_2$—), butenyl-1,

pentenyl-1, γ-isopropyl allyl, β-ethyl-γ-propyl allyl, 2-methyl-octenyl-6, decenyl-1, decenyl-2, undecenyl, dodecenyl-2, octadecenyl, docosenyl, pentamethyl eicosenyl.

Substituted alkyl: cyanoethyl, cyano-n-propyl, cyano-isopropyl, cyano-n-butyl, cyano-isobutyl, cyano-n-amyl, cyano-isoamyl, cyanohexyl, cyanoheptyl, cyano-n-octyl, cyano-nonyl, cyanodecyl, cyanolauryl, cyanostearyl and the like, hydroxyethyl, hydroxy-n-propyl, hydroxy-isopropyl, hydroxy-n-butyl, hydroxy-isobutyl, hydroxy-n-amyl, hydroxy-isoamyl, hydroxy-hexyl, hydroxy-heptyl, hydroxy-nonyl, hydroxy-decyl, hydroxy-lauryl, hydroxy-stearyl and the like, carbomethoxyethyl, carbomethoxy-propyl, carbomethoxybutyl, carbomethoxyamyl, carbomethoxyhexyl, carbethoxyethyl, carbethoxypropyl, carbethoxybutyl, etc., carbopropoxyethyl, carbopropoxypropyl, carbopropoxybutyl, etc., carbobutoxyethyl, carbobutoxybutyl, etc., chloroethyl, chloropropyl (N-propyl, isopropyl), chlorobutyl (N-butyl, isobutyl, etc.,) chloroamyl, chlorohexyl, chlorodecyl, chlorolauryl, and the like, bromoethyl, bromopropyl (n-propyl, isopropyl), bromobutyl (N-butyl, isobutyl, etc.,) bromoamyl, bromohexyl, bromodecyl, bromolauryl, and the like, methoxyethyl, methoxypropyl (N-propyl, isopropyl), methoxybutyl (N-butyl, isobutyl, etc.,) methoxyamyl, methoxyhexyl, methoxydecyl, methoxylauryl, and the like, ethoxyethyl, ethoxypropyl (N-propyl, isopropyl), ethoxybutyl (N-butyl, isobutyl, etc.) ethoxyamyl, ethoxyhexyl, ethoxydecyl, ethoxylauryl, and the like, hydroxyethoxyethyl, hydroxyethoxypropyl, hydroxyethoxybutyl, hydroxyethoxyamyl, hydroxypropoxyethyl, hydroxypropoxypropyl, hydroxypropoxybutyl, hydroxypropoxyamyl, hydroxybutoxyethyl, hydroxybutoxypropyl, hydroxybutoxybutyl, hydroxybutoxyamyl.

Halogen: fluorine, chlorine, bromine, iodine.

Acyl: acetyl, propionyl, butanoyl, amoyl, etc., benzoyl, toluoyl, naphthoyl, etc.

Sulfonyl: $CH_3SO_2$, benzene sulfonyl, toluene sulfonyl, etc.

Oxy: hydroxy, methoxy, ethoxy, hydroxyethoxy, etc.

Carboxamide (—$CONH_2$): N-methyl carboxamido ($CONHCH_3$)

N-ethyl carboxamido, N-dimethyl carboxamido, N-diethyl carboxamido, etc.

The general process for preparing the compounds of this invention involves a condensation of the hetero ketone with malononitrile or preferably with cyanoacetamide followed by dehydration to the dinitrile.

Suitable ketones include the following:

bis(3,5-dimethyl-4-propyl-3-pyrryl) ketone
bis(5-bromo-4-ethyl-3-methyl-2-pyrryl) ketone
bis(3-ethyl-5-methyl-2-pyrryl) ketone
bis(4-ethyl-3-methyl-2-pyrryl) ketone
bis(5-ethyl-3-methyl-2-pyrryl) ketone
bis(5-bromo-2-thienyl) ketone
bis(5-methyl-2-thienyl) ketone
bis(5-chloro-2-thienyl) ketone
5-chloro-2-thienyl 5-bromo-2-thienyl ketone
(5-chloro-2-thienyl)-2-thienyl ketone
5-methyl-2-thienyl 5-bromo-2-thienyl ketone
5-methyl-2-thienyl 5-chloro-2-thienyl ketone
2,5-dimethyl-3-thienyl 5-chloro-2-thienyl ketone
5-chloro-2-thienyl 5-ethyl-2-thienyl ketone
2,5-dimethyl-3-thienyl 2-thienyl ketone
bis(5-methyl-2-thienyl) ketone
bis(2,5-dimethyl-3-thienyl) ketone
2-furyl 3-indolyl ketone
2-furyl 2-thienyl ketone
2-furyl 3-thienyl ketone
2-furyl 2-methyl-3-indolyl ketone
2-furyl 1-methyl-3-indolyl ketone
3-indolyl 2-thienyl ketone
2-pyrryl 2-thienyl ketone
2,5-dimethyl-3-thienyl 2-thienyl ketone
2,5-dimethyl-3-thienyl 2-furyl ketone
2-pyridyl 4-pyridyl ketone
3-pyridyl 4-pyridyl ketone
5-chloro-2-thienyl 2-furyl ketone
5-chloro-2-thienyl 3-furyl ketone
3-indolyl 5-methyl-2-thienyl ketone
3-indolyl 2-pyridiyl ketone
2-thienyl 3-thienyl ketone
2-thienyl 5-(2-thienyl)-2-thienyl ketone
2-thienyl 6-(2-thienyl)-3-pyridyl ketone
5-ethyl-2-thienyl 2-furyl ketone In addition to the above contemplated derivatives, polyoxylated derivatives thereof are within the purview of this invention. Any of the aforementioned compounds containing at least one reactive hydrogen atom may be reacted with an alkylene oxide or a compound functioning as an oxide (or mixtures thereof) such as: ethylene oxide, propylene oxide, butylene oxide, butylene dioxide, isobutylene oxide, glycidol, epichlorohydrin, butadiene dioxide, isobutylene oxide, styrene oxide, and the like to yield the corresponding polyoxyalkylated products. Among the types of compounds which are reactive in this manner are: hydroxy compounds, amide compounds, carboxy compounds, etc. From one to about 200 moles of oxyalkylating agent may be condensed with the said reactive compounds.

The following examples will serve to illustrate the present invention without being deemed limitative thereof. Parts are by weight unless otherwise indicated.

Example 1.—I. Preparation of bis-(2-thienyl) methylene malononitrile

Into a dry flask fitted with a stirrer, thermometer, reflux condenser to the top of which is attached a drying tube containing anhydrous calcium chloride, and heating mantle, there are added 20.0 grams of α-cyano-β-bis(2- thienyl) acrylamide and 67 grams (=40 mls.) of phosphorus oxychloride. The reaction mixture is heated to 60° C. and stirred until complete solution occurs. Then the stirring is continued for ¾ hour longer at 60° C. The reaction mixture is cooled to room temperature and drowned into 500 grams of ice-water slush. The slurry is stirred 1½ hours at 0–5° C., filtered and washed with 1000 grams of water. The crude product is dried at 80° C. and then stirred with 300 mls. benzene. The slurry is clarified to remove insolubles. The clear benzene extract is evaporated and the residue is recrystallized from 375 mls. isopropanol using animal charcoal. The product is filtered from isopropanol at 5° C. and dried at 80° C. There is obtained 12.4 grams of bis (2-thienyl) methylene malononitrile.

II.—Preparation of α-cyano-β-bis(2-thienyl) acrylamide

Into a 500 ml. three-necked flask fitted with a stirrer, thermometer, Barrett type water separator (which allows the upper layer to pe returned to the reaction flask), reflux condenser and heating mantle are added 50 grams of bis-(2-thienyl) ketone (M.W.=194, =0.25 moles), 21.0 grams of cyanoacetamide (M.W.=84, =0.25 moles), 4.0 grams of ammonium acetate, 24 mls. of glacial acetic acid and 50 mls. benzene. The reaction mixture is then heated to vigorous reflux and stirred for 55 hours at 90°–100° C. During this period 1.0 gram additions of ammonium acetate are made after 7 hours, 25 hours and 30 hours. The benzene is then steam distilled from the reaction mixture. The residue after steam distillation is filtered at 35° C. The solid material is washed on the funnel with 200 mls. of water and then ground in a mortar to break up lumps. This material is then heated to 75° C. with 250 mls. isopropanol, cooled to 5° C. After air drying at 75° C., there is obtained 56 grams of acrylamide compound.

Example 2

Example 1 is repeated employing the following ketones in the acrylamide preparation:

(a) bis-(3-thienyl) ketone
(b) 2 furyl ketone (bis)
(c) bis(5-methyl-2-thienyl) ketone
(d) bis(5-chloro-2- thienyl) ketone
(e) 5-methyl-2-thienyl 5-bromo-2-thienyl ketone
(f) 2,5-dimethyl-3-thienyl 2-thienyl ketone
(g) 2-furyl 2-thienyl ketone
(h) 2-pyrryl 2-thienyl ketone
(i) 3-indolyl 2-pyridyl ketone
(j) 5-chloro-2-thienyl 3-furyl ketone Example 3

The product of Example 1 is used in a nitrocellulose lacquer as follows:

A mixture of 20 parts of solution I and 80 parts of solution II is prepared wherein solution I consists of:

Nitrocellulose _____ parts ½ sec__ 46
Product of Example 1 _____ parts__ 4
Cellolyn 502 (non-drying plasticizing alkyd resin of Hercules Powder Co.) _____ do____ 35
Dibutyl phthalate _____ do____ 15 and solution II consists of:

Parts
Butyl acetate _____ 35
Butanol _____ 15
Toluene _____ 50

The resulting lacquer solution is drawn out on a metal plate with a Bird film applicator to give a 3 mil film. A similar film is prepared without the product of Example 1. Upon exposure to ultra-violet light, the latter film yellows and deteriorates before any visible signs of yellowing are observed in the protected film.

Example 4

Example 1 is repeated employing as the ketone, 2,5-dimethyl-3-thienyl 5-chloro-2-thienyl ketone.

Example 5

Example 1 is again repeated using as the ketone, bis-(2,5-dimethyl-3-thienyl)ketone.

Example 6

Example 2 is repeated employing as the ketone, 5-ethylhexyloxy-2-thienyl 2-thienyl ketone.

Example 7

The product of Example 2(c) is incorporated into a synthetic latex as follows:

A 50% disperison of the absorber of Example 2(c) is made by kneading 20 g. of the compound with 20 g. of formaldehydenaphthalene - 2 - sodium sulfonate (Tamol NNO) in a Werner-Pfleiderer mixer for several hours in the presence of sufficient water to keep the material in a viscous state. The material is then evaporated to dryness to give the dispersed form of the absorber. The dispersed absorber is then incorporated into an acrylonitrilebutadiene latex (Chemigum 247) employing 5% of the absorber based on the weight of the latex. The latex is then sprayed onto leather. The film prepared in this manner shows less tendency to yellow on exposure to light than a similar film prepared in the same manner but omitting the ultra-violet absorber.

Example 8

The product of Example 2(d) is prepared as a 3% solution in Methyl Cellosolve and a sponge of polyvinyl chloride foam is impregnated therewith. The foam is prepared from the following formulation:

Parts
Marvinol VR–10 (polyvinyl chloride resin-U.S. Rubber) _____ 100
di-2-ethylhexylphthalate _____ 130
Di-2-ethylhexylphthalate _____ 130
Barium cadmium stabilizer (Advance BS–105) __ 3.5
Celogen (p,p' - oxybis(benzenesulfonyl)hydrazide) 35
_____
258.5

The sponge is squeezed free of solvent and dried. It is much more stable to ultra-violet light than untreated material.

Example 9

One mole of the reaction product of 5-sulfamyl-2-thienyl 2-thienyl ketone in the Example 1 procedure to produce the malononitrile is oxyalkylated by reaction with 6 moles of ethylene oxide in the presence of 1.2% KOH at 85° C. in an autoclave. The product has the formula:

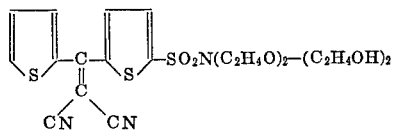

Example 10

The procedure of Example 9 is repeated using 15 moles of ethylene oxide. The final product contains 15 oxyethyl groups and 2 terminal hydroxy groups.

Example 11

The product of Example 10 is dispersed in water (2 g./100 g. water) and is used to treat paper, cotton, and gelled regenerated cellulose. Excellent protection against ultra-violet light degradation is obtained.

Example 12

The product of Example 10 is employed in formulating a liquid detergent as follows:

| | Parts |
|---|---|
| Tetrapotassium pyrophosphate | 25 |
| Nonyl phenol+10 ethylene oxide condensate | 10 |
| Product of Example 10 | 2 |
| Sodium silicate | 3 |
| Carboxy methyl cellulose (low vis.) | 0.5 |
| KOH | 2 |
| Water | 57.5 |

The final formulation shows no degradation when exposed to ultra-violet light for 100 hours.

The compounds of this invention are soluble in many diverse types of polymers, resins, waxes and the like, and therefore they are particularly suitable and adaptable for the stabilization of such materials as exemplified above. The non-oxyalkylated products are insoluble in water. Those compounds which contain lesser amounts of oxyalkyl groups, that is, up to about 4–6 groups per molecule, are in general less soluble in the non-polar solvents but are readily dispersible in water. The compounds containing larger amounts of alkylene oxide, that is, above about 6 moles thereof per mole of base compound, range from soluble in water with the solubility increasing as the number of oxyalkylene groups increases.

The ultra-violet absorbing compounds of the present invention may be used to stabilize all organic materials which are susceptible to ultra-violet degradation and are particularly useful in the stabilization of resins and plastics, whether they be in the form of films or molded products and either clear, opaque, semi-opaque or translucent. Foam, plastics and fibers are also admirably stabilized by these compounds. Pigments, polishes, creams, lotions, paints, enamels, varnish films and dyestuffs when susceptible to ultra-violet degradation have been found to be excellently stabilized by the compounds of the present invention. The amount of stabilizer to be incorporated in such compositions is not critical except that a sufficient amount should be present to effect an acceptable degree of stabilization and no more should be used than is necessary to obtain such results. In general, between about 0.1% and 10% by weight based upon the organic solids weight to be stabilized may be used.

Other variations in and modifications of the described processes which will be obvious to those skilled in the art can be made in this invention without departing from the scope or spirit thereof.

We claim:

1. An essentially colorless compound exhibiting a prominent absorption peak between 250 mμ and 400 mμ of the formula:

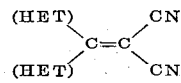

wherein each (HET) represents, independently, a heterocyclic nucleus containing at least one pair of conjugated double bonds and selected from the group consisting of 5- and 6-membered monocyclic heterocycles containing as the hetero atoms at least one member selected from the group consisting of oxygen, nitrogen and sulfur, and the corresponding benzo monocyclic heterocycles, said nucleus being devoid of nitro and nuclear-bonded amine groups.

2. A compound as defined in claim 1 wherein each (HET) represents the same hetero nucleus.

3. A compound as defined in claim 1 wherein each (HET) represents a different hetero nucleus.

4. A compound as defined in claim 2 wherein each (HET) represents a thiophene nucleus.

5. A compound as defined in claim 2 wherein each (HET) represents a furane nucleus.

6. A compound as defined in claim 2 wherein each (HET) represents a pyrane nucleus.

7. A compound as defined in claim 3 wherein one (HET) represents a thiophene nucleus and the other (HET) a furane nucleus.

8. A compound as defined in claim 1 wherein each (HET) is a 2-thienyl radical.

9. A compound as defined in claim 1 wherein each (HET) is a 2,5-dimethyl-3-thienyl radical.

10. A compound as defined in claim 1 wherein each (HET) is a 5-methyl-2-thienyl radical.

11. A compound as defined in claim 7 wherein one (HET) is a 2-thienyl radical and the other (HET) is a 2-furyl radical.

References Cited

UNITED STATES PATENTS

| 2,978,462 | 4/1961 | Berman et al. | 260—345.2 |
| 3,022,318 | 2/1962 | Berman et al. | 260—345.2 |
| 3,072,481 | 1/1963 | Berman et al. | 96—48 |
| 3,085,469 | 4/1963 | Carlson. | |

OTHER REFERENCES

Fieser et al. Organic Chemistry, (Heath, Boston 1950) pp. 238, 732.

Cotton et al. Adv. Inorg. Chem. (Interscience) 1962 pp. 385, 389.

HENRY R. JILES, *Primary Examiner.*

C. M. SHURKO, *Assistant Examiner.*